J. R. HYDE.
Cooking Stove.
No. 2,709. Reissued July 30, 1867.
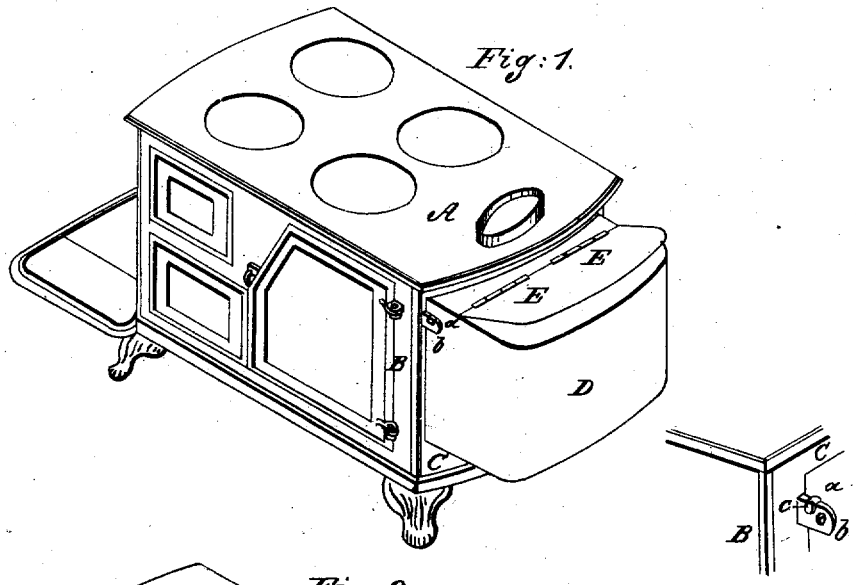
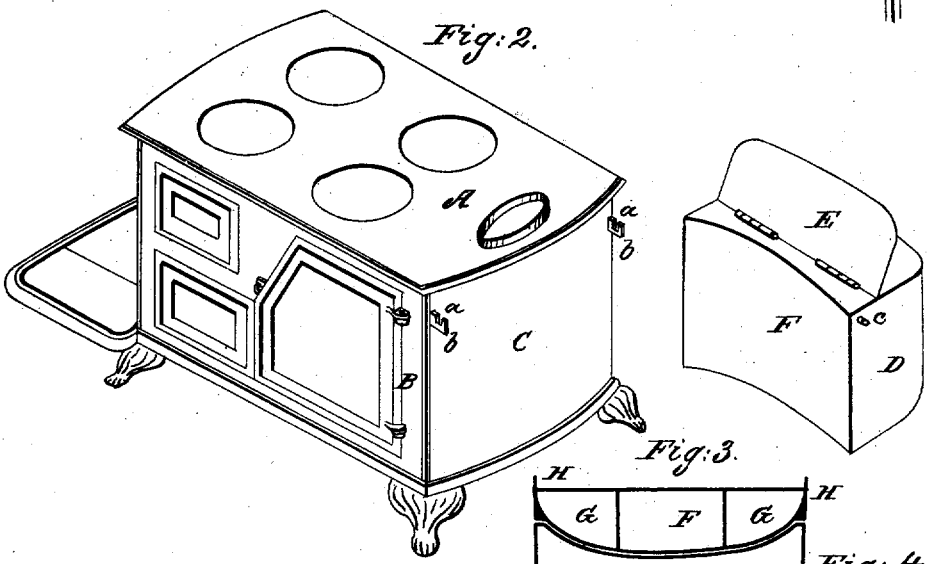
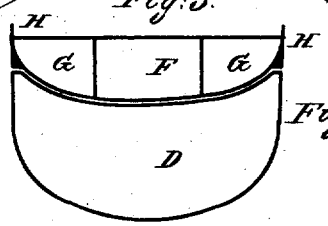
Witnesses:
Charles E. Potter.
Louis Potter.
Inventor:
James R. Hyde
per Daniel E. Paris
Sole assignee
N. PETERS, Photo-Lithographer, Washington, D. C.

United States Patent Office.

DANIEL E. PARIS, OF TROY, NEW YORK, ASSIGNEE BY MESNE ASSIGNMENTS OF JAMES R. HYDE.

*Letters Patent No.* 35,564, *dated June* 10, 1862; *reissue No.* 2,709, *dated July* 30, 1867.

COOKING-STOVE.

The Schedule referred to in these Letters Patent and making part of the same.

TO ALL WHOM IT MAY CONCERN:

Be it known that JAMES R. HYDE, of the city of Troy, Rensselaer county, and State of New York, invented new and useful improvements in Reservoirs for Cooking-Stoves, which invention he assigned to the firm of Charles Eddy & Co., of the above-named place, and to whom as such assignees Letters Patent were issued by the United States on the 10th of June, 1862, and which Letters Patent were assigned by the above-named Charles Eddy & Co., on the 24th of January, 1867, to Daniel E. Paris, of the city of Troy, Rensselaer county, and State of New York; and I do hereby declare that the following is a full and accurate description of the said invention, reference being had to the accompanying drawings, and to the letters of reference marked thereon, like letters representing like parts.

Figure 1 is a perspective view of the stove with the reservoir attached.

Figures 2 and 3 show the same stove with the reservoir detached.

The back of the stove C is curved. The side F of the boiler D is also curved, so as to correspond to and with the back of the stove. The new features are, the manner in which the reservoir is heated from its upright front side; and, second, the shape of the reservoir; and, third, the manner of attaching it to the stove, and the arrangement of the cover. As a whole and in detail the invention consists in constructing and placing a hot-water reservoir or boiler in rear of a diving-flue cooking-stove, and below the top plate of the same, with the front part of the reservoir concave, while the back part is convex as regards the outer sides. The reservoir is heated entirely from its front upright side by the products of combustion as they pass down and up the rear flues of the stove.

Water-reservoirs or large boilers of this class have heretofore been placed and heated differently, and made in a different shape—made generally with all four sides convex, that is, swelling outward, so as to be strong and durable, a convex or concave shape being stronger than a straight, flat surface. Boilers used for this purpose have always been heated in a different way from this, and generally from the bottom, with or without the exit pipe through the centre, or else like a kettle which sets down through the top plate, either over the fire or back away from the fire; but in either case the products of combustion not only act on the bottom of the vessel, but on the sides and ends, and generally, if not always, on both sides and both ends, and so far up as the boiler may set through the top plate; but this manner of heating required an expensive casing around the boiler. This would not be so objectionable in a movable boiler or kettle, for its place might be used when needed for other purposes, but with a boiler designed, as this is, to be a permanent fixture, the stove would have to be made just so much larger, made large enough to enclose the boiler, which would make the stove half as large again; therefore both the manner of heating the boiler, in this case, and its peculiar shape also, are considered new and valuable features, the first because of its cheapness, simplicity, and economy, and the second because it will heat so much quicker, and because of its strength and durability. It is cheap and economical to make a stove and boiler in this way, for the reason that it is heated by the waste heat of the rear flues of the stove as it passes down and up said flues to the exit pipe, the heat in said flues is not diverted out of its regular course, the products of combustion pass around the oven in the shortest direction, and are not at all impeded by the reservoir; thus the stove will work just as well, and perform just as much work with as without the reservoir. But if the heat or products of combustion were carried under the boiler, or around its sides and bottom, it would be diverted from its natural course, would do less service to the oven, and, what is more, there would have to be a metallic casing enclosing its bottom and sides, or else the heat would escape; but by heating it from one side, that next adjoining the rear upright flues, the expense in casing is avoided altogether; and the expense in casing so large a boiler as this would be greater than the whole cost of the boiler itself.

The back plate C is made very thin, so as to get all the heat required, and that accomplished, there is nothing left to be desired. The concave and convex shape of this boiler contributes largely to its heating qualities, and in this respect it is a great improvement over the old style of reservoir, and especially when made, as herein shown, without casing, and heated from or on one side only, for the water will heat a great deal faster by being made to follow the curve of the back flues of the stove, on the principle that the nearer heat gets to the centre of a body the quicker it will feel its effects, the same amount of heat producing a far greater result; thus the two sides, the front and rear walls of the reservoir, are both made concave as regards the outer shape of the rear flues; thus the water enclosed between these two sides in the boiler is brought as near as possible to the hot-air passage-ways of said rear flues, thus allowing and compelling all the products of combustion to act upon the entire front surface of the reservoir before they enter the exit pipe, the back plate C only intervening, which latter plate may be made as thin as desired, so as to facilitate the heating. The reservoir is attached to the back or ends of the side plates of the stove by means and use of a bolt, which shall have a nut and screw, the design of which is to hold the reservoir closely and firmly with the stove, so that the heat as it passes down and up in the rear flues of the stove shall act upon it, leaving no opening, or as little as possible, for the cold air to get between it and the other plates of the stove. The device shown in fig. 2, where a bracket or lug is cast on the upright plate of the stove, has a notch cut or cast in said lug, into which a pin, cast or made at the side or end of the reservoir, fig. 3, is dropped, and thus held to the stove. This mode is inferior to the bolt with nut and screw, which latter has always been employed since the invention has been in use. The cover E to the reservoir is made so that it will stand up perpendicularly, and when so standing the steam, as it condenses on its inner surface, will drip back into the reservoir, and not run off on to the floor.

The whole combination here produces a cheap, convenient, and accessible place for heating water, and it is out of the way of everything else about the stove; nor does it interfere in the least with the regular operations of the stove, is heated by the waste heat of the rear flues, and there is no expense except the cost of the reservoir itself, which is not the case with any other style of reservoir, for heretofore it has been necessary to make a place, a chamber, seat, or the like, for the reservoir to occupy, which incurs an expense to start with, but which is not necessary in this invention.

What is claimed as the invention of the said JAMES R. HYDE is—

1. A reservoir thus situated, constructed with a concave front next adjoining said rear flues, the back of which latter shall be of a similar and conforming shape, for the purpose set forth and herein explained.

2. Bolting or fastening the reservoir to the upright plate of the stove, substantially as here shown and described.

DANL. E. PARIS,

Witnesses:

CHARLES E. POTTER,
LOUIS POTTER.